United States Patent Office 3,758,517
Patented Sept. 11, 1973

3,758,517
PREPARATION OF C-17α ALKYL SUBSTITUTED PROPADIENYL STEROIDS
John A. Edwards, Los Altos, Calif., assignor to Syntex Corporation, Panama, Panama
No Drawing. Continuation-in-part of application Ser. No. 45,566, June 11, 1970, which is a continuation-in-part of application Ser. No. 877,521, Nov. 17, 1969, which in turn is a continuation-in-part of application Ser. No. 817,563, Apr. 18, 1969. This application Nov. 23, 1971, Ser. No. 201,559
Int. Cl. C07c *169/20*
U.S. Cl. 260—397.4        18 Claims

ABSTRACT OF THE DISCLOSURE

Disclosed is a process for the preparation of alkyl substituted propadienyl steroids of the estrogen, estrane, and androstane series which contain optional substitution at other positions of the nucleus. This process involves treating a corresponding 3-(substituted propynyl) steroid wherein the substituent is halo, hydroxy or a conventional hydrolyzable ester or ether thereof, preferably bromo, chloro, or iodo, with a lithium dialkyl copper reagent. The 17α-propadienyl products are useful as estrogenic, anti-androgenic, progestational and anti-fertility agents. Those in the 6,6-difluoro series are novel.

---

This is a continuation-in-part of Ser. No. 45,566, filed June 11, 1970 which is a continuation-in-part of Ser. No. 877,521, filed Nov. 17, 1969 which is a continuation-in-part of Ser. No. 817,563, filed Apr. 18, 1969.

The present invention relates to C–17α alkyl substituted propadienyl steroids, novel derivatives thereof, and a novel process which is useful in the preparation of these useful steroidal compounds using a lithium dialkyl copper reagent.

The C–17α alkyl substituted propadienyl group of the compounds of the present invention can be represented as follows:

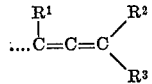

wherein each $R^1$, $R^2$, and $R^3$ is as defined infra.

Of the C–17α alkyl substituted propadienyl compounds of the present invention, those in the 6,6-difluoroandrostane and -19-norandrostane series are novel and can be represented by Formula A:

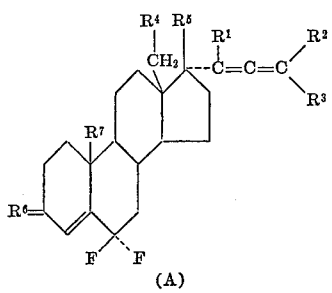

(A)

In the above formula, $R^1$ is lower alkyl;
each of $R^2$ and $R^3$ is hydrogen or lower alkyl;
$R^4$ is hydrogen or alkyl of one to three carbon atoms, inclusive;
$R^5$ is hydroxy or a conventional hydrolyzable ester or ether thereof;

$R^6$ is an oxo group or the group

in which $R^8$ is hydrogen, hydroxy or a conventional hydrolyzable ester or ether thereof; and
$R^7$ is hydrogen or methyl.

The compounds of the present invention of Formula A demonstrate progestational and pituitary inhibiting activity and are thus useful in the control of fertility and the control of various menstrual disorders. In this usage, they can be administered and employed in the same manner as known compounds having like utility such as norethisterone.

Others of the C–17α alkyl substituted propadienyl compounds of the present invention have been described. For example, U.S. Pats. 3,392,165 and 3,392,166 disclose, inter alia, compounds in the estrogen, estr-4-ene, estr-5(10)-ene, and androst-4-ene series represented by Formulas II, III and IV.

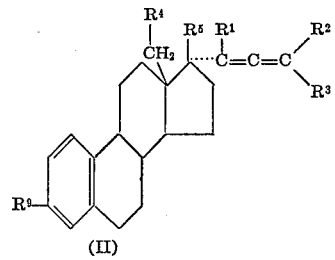

(II)

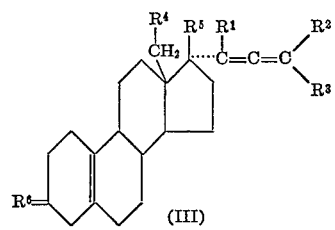

(III)

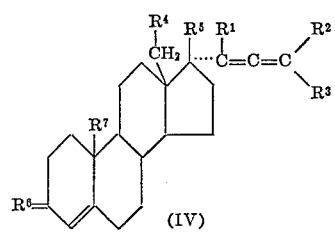

(IV)

wherein each of $R^1$, $R^2$, $R^3$, $R^4$, $R^5$, $R^6$, $R^7$, and $R^8$ is as above defined and $R^9$ is lower alkoxy of from 1 to 8 carbon atoms, inclusive, cycloalkyloxy, hydroxy or a conventional hydrolyzable ester or ether thereof.

The art describes the use of the compounds in the estra-1,3,5(10)-triene series (Formula II) as estrogenic and anti-androgenic agents and in the estr-5(10)-ene, estr-4-ene, and androst-4-ene series (Formulas III and IV), as progestational and pituitary inhibiting agents. As such, these compounds are useful in the manner corresponding to such activity such as, in the first instance, the control and regulation of fertility and the treatment of acne, benign prostate hypertrophy, and hirsutism in females and, in the second instance, the treatment of various menstrual disorders and in the control and regulation of fertility.

Although the process of the present invention is useful generally for the preparation of C–17α alkyl substituted propadienyl steroids, when operating in accordance with preferred embodiments, the present invention is particularly useful for the preparation of the C–17α alkyl substituted propadienyl steroids of the estrogen, estrane, and androstane series depicted by the above Formulas A, II, III and IV.

The novel process of the present invention by which these C–17α alkyl substituted propadienyl steroid compounds are prepared comprises reacting a 17α-(3-substituted propynyl) steroid, wherein the substituent is halo, hydroxy or a conventional hydrolyzable ester or ether thereof, with a lithium dialkyl copper reagent.

The process of the present invention, in its preferred embodiments, comprises reacting a 17α-(3-substituted propynyl) steroid, wherein the substituent is bromo, chloro, or iodo, with a lithium dialkyl copper reagent. This process can be represented further by the following reaction sequence of partial formulas (B→C):

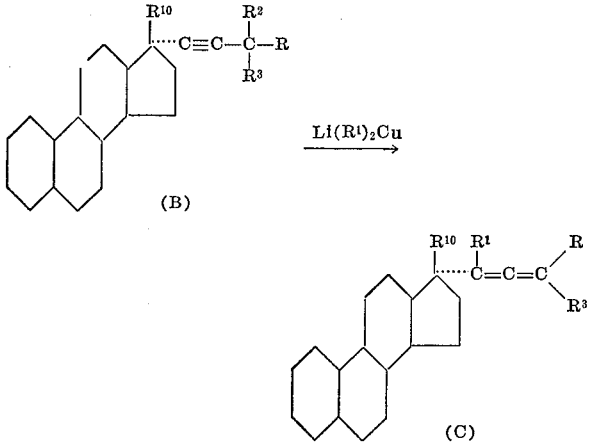

wherein each of $R^1$, $R^2$, and $R^3$ is as defined above; R is bromo, chloro, or iodo and preferably bromo; and $R^{10}$ is tetrahydrofuran-2-yloxy, tetrahydropyran-2-yloxy, 4-methoxytetrahydropyran-4-yloxy, lower alkoxy, or lower alkoxymethyleneoxy and preferably tetrahydropyran-2-yloxy or lower alkoxy, e.g. methoxy.

In the present invention, suitable lithium dialkyl copper reagents are those wherein the dialkyl moieties are the same, each alkyl containing 1 to 4 carbon atoms, such as lithium dimethyl copper, lithium diethyl copper, lithium dipropyl copper, and lithium dibutyl copper. The lithium dialkyl copper reagents can be prepared by the reaction of cuprous iodide and alkyllithium.

The process of the present invention is conducted at temperatures ranging from about —20° C. to about +80° C., preferably from about —20° C. to about +20° C., and for a period of time sufficient to complete the reaction ranging from about 1 to about 24 hours. In the practice of this process, the reactants are contacted and maintained in any convenient order or fashion, preferably within the given temperature range. After the reaction, the product is separated and isolated from the reaction mixture via conventional techniques such as evaporation, filtration, decantation, extraction, chromatography, and the like.

The process of the present invention is conveniently conducted in the presence of liquid organic reaction media. Suitable liquid reaction media include the customary organic solvents such as aromatics, e.g. benzene, toluene, and the like; aliphatics, e.g., hexane, octane, and the like; ethers, e.g. diethyl ether, dioxane, tetrahydrofuran, and the like; glycol ethers, e.g. monoglyme, diglyme, and the like; individually or mixtures thereof. One useful cosolvent is hexamethylphosphoramide.

The reaction consumes the reactants on the basis of one equivalent of the 17α-(3-substituted propynyl) compound per equivalent of lithium dialkyl copper reagent. However, the relative amounts of the reactants employed are not critical, some of the desired product being prepared when employing any proportions thereof. In the preferred embodiments, from 1 to about 5 equivalents of the lithium dialkyl copper reagent is employed per equivalent of 17α-(3-substituted propynyl) starting steroid, the liquid reaction media, if employed, being used in excess, solvent amounts.

The compounds hereof are prepared via a sequence which can be illustrated further by partial formulas as follows (Sequence A):

Sequence A

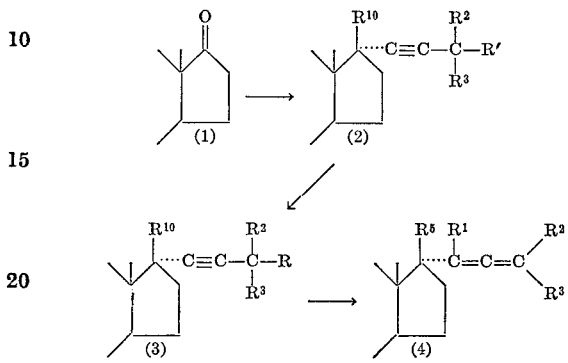

wherein R' is tetrahydrofuran-2-yloxy, tetrahydropyran-2-yloxy, or 4-methoxytetrahydropyran-4-yloxy and each of R, $R^1$, $R^2$, $R^3$, $R^5$ and $R^{10}$ is as defined above.

With reference to the above Sequence A, the 17α-(3-tetrahydrofuran-2'-yloxypropynyl), 17α - (3 - tetrahydropyran-2'-xyloxypropylnyl), and 17α-(3-(4'-methoxytetrahydropyran-4'-yloxy)propynyl) groups in the 3-desalkyl, 3-alkyl, 3,3-dialkyl ($R^2$, $R^3$) series (2) are prepared by treating the corresponding 17-oxo steriod (1) with a Grignard reagent. The Grignard reagent is prepared upon treatment of ethyl magnesium bromide with the reaction product of propargyl, α-alkylpropargyl, and α,α-dialkylpropargyl alcohol, respectively, with dihydrofuran, dihydropyran, and 4-methoxy-5,6-dihydro-2H-pyran, respectively, namely 3-tetrahydrofuran-2'-yloxypropyne, 3-tetrahydropyran - 2' - yloxypropyne, 3-(4'-methoxytetrahydropyran-4'-yloxy)propyne, and the corresponding 3-alkyl and 3,3-dialkyl derivatives thereof.

The respective ethers (2) are selectively hydrolyzed to the corresponding hydroxy compound which is converted to the halogen (R) compounds (3), as described below.

Compounds (3) are then converted to corresponding compounds (4) in accordance with the novel and principal process hereof, as set forth in more detail above, to give the 17β-ether compounds which, if desired, can be hydrolyzed and conventionally re-etherified or esterified to give the 17β-conventional ethers and esters ($R^5$).

The 17α-(3-halopropynyl) starting compounds or alkyl derivatives thereof are prepared from the corresponding 17α-(3-hydroxypropynyl) compounds which are obtained from the ethers thereof (prepared as described above) upon conventional hydrolysis, such as with a mineral or organic acid. The halogenation-replacement conversion is accomplished in the bromo and chloro series by treatment of the hydroxy compound with thionyl bromide or phosphorus pentabromide or with thionyl chloride or phosphorus pentachloride in the presence of a tertiary amine base such as the tertiary alkyl amines, pyridine, lutidine, and so forth. The reaction is carried out in any convenient order or fashion at temperatures of from about 0° to about 20° C. and conveniently, in organic liquid reaction medium, such as ether, benzene, and the like. The iodo compounds can be prepared by iodo replacement of the bromo or chloro compounds by treatment of the latter with sodium iodide.

Alternatively, the bromo and chloro derivatives can be prepared by treating the hydroxy compound with triphenylphosphine and carbon tetrabromide or carbon tetrachloride in organic reaction medium, such as dimethylformamide and dioxane, at about 110° C. for a few minutes followed by the usual recovery procedures.

In the fluoro series, the hydroxy compound is treated by the method of U.S. Pat. 3,444,188 or with a hydrocarbon sulfonyl fluoride including benzyl sulfonyl fluoride, tosyl fluoride and mesyl fluoride. This process also preferably employs an inert hydrocarbon solvent, such as hexane, heptane, benzene, toluene, or an esterified or etherified alcohol, such as dimethoxyglycol. Other suitable solvents are chloroform and nitromethane. The reaction is carried out at temperatures of from 0° C. to about 150° C. for from 1 to about 8 hours.

In the preferred embodiments, the process of Sequence A is practiced by preparing compound (2) wherein R' is tetrahydropyran-2'-yloxy and $R^{10}$ is hydroxy, etherifying at 17β to the, e.g. methoxy ether ($R^{10}$=methoxy), selectively hydrolyzing the tetrahydropyran-2'-yloxy (R') ether, and brominating the hydroxy compound to prepare compound (3) wherein R is bromo and $R^{10}$ is methoxy.

Alternatively, the compounds of the present invention are prepared via Sequence B:

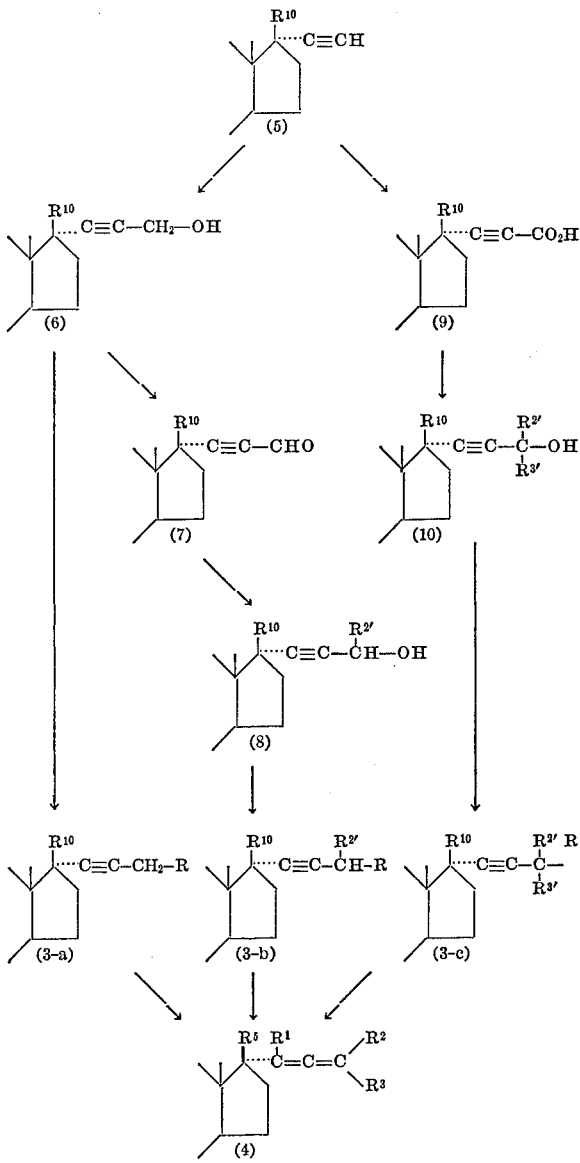

wherein each of R, $R^1$, $R^2$, $R^3$, $R^5$ and $R^{10}$ is as defined above, $R^{2\prime}$ is lower alkyl, and $R^{3\prime}$ is lower alkyl.

With reference to reaction Sequence B, starting, compound (5) preferably the 17β-tetrahydropyran-2'-yl ether, is treated with butyl lithium and formaldehyde or paraformaldehyde to prepare the corresponding 3-hydroxypropynyl compound (6). This compound is then halogenated to the 3-halopropynyl compound as described above to give (3–a; R=halo). A compound of Formula 3–a is then treated in accordance with the novel and principal process hereof to prepare the compound of the present invention (4) wherein $R^1$ is alkyl and each of $R^2$ and 3 is hydrogen.

Alternatively, the compound of Formula 5 can be converted with methyl magnesium bromide and carbon dioxide to the corresponding ethynyl carboxylic acid (9) as described in J. Med. Chem. 6, 182 (1963). The acid is then treated with two equivalents of an alkyl lithium to prepare the 3,3-dialkyl-3 - hydroxypropynyl compound (10). This is then converted into the halo compound (3–c), which is then treated in accordance wtih the novel, principal process hereof to prepared the compound of the present invention of Formula 4 wherein each of $R^1$, $R^2$, and $R^3$ is alkyl.

Alternatively, the hydroxy propynl compound of Formula 6 is treated with chromic oxide and pyridine or manganese dioxide in chloroform to prepared the corresponding aldehyde (7). This is alkylated with one equivalent of an alkyl magnesium bromide to prepare (8). Conversion of (8) to (4) via (3–b), as described above, prepares the compounds of the present invention of (4), wherein $R^1$ is alkyl and one of $R^2$ and $R^3$ is hydrogen and the other is alkyl.

The foregoing can be practiced upon starting compounds which bear the 6,6-difluoro grouping. In practice, the 6,6-difluoro grouping is introduced into the precursor androst-4-ene-3,17-diones and 19-norandrost-4-ene-3,17-diones or 18-alkyl derivatives thereof. One method by which this is done is described in U.S. Pat. 3,219,673. This method involves treating a 3-acyloxy-5-fluoro-6-keto steroid (which are known or can be prepared as described in the cited patent and its references) with sulfur tetrafluoride to prepare the corresponding 3-acyloxy-5,6,6-trifluoro steroid which is hydrolyzed to the 3-hydroxy-5,6,6-trifluoro compound. The latter compound is oxidized to the corresponding 3-keto-5,6,6-trifluoro derivative which is then treated with a dehydrofluorinating agent such as alumina to provide the 3-keto-$\Delta^4$-6,6-difluoro compound.

Another method by which these 6,6-difluoro steroids are prepared involves twice consecutively forming an enol ether and treating this with perchloryl fluoride. Thus, the starting androst-4-ene-3,17-dione is converted to its enol ether and it is treated with perchloryl fluoride to form the 3-keto-$\Delta^4$-6-fluoro derivative. The same procedure is followed with this compound to form the 3-keto-$\Delta^4$-6,6-difluoro products.

The conventional ethynylation in the preparation of compound (5) involves the use of alkali metal acetylide, see U.S. Pat. 3,126,376 to Robinson and the conventional esterification involving the use of the carboxylic anhydride and pyridine solution and the conventional etherification involves the use of tetrahydropyran or tetrahydrofuran in the presence of paratoluenesulfonyl chloride.

In the preferred embodiments, the desired noninterfering elaborative groupings at the other optional sites of the molecule are introduced prior to the novel, principal reaction hereof. Protection is preferably provided for those groups which may compete or interfere with the principal reaction hereof or with the processes preparative to the principal reaction hereof. Examples of such protection include forming the ketal or enol ethers of the 3-oxo function which can be restored later in the synthetic sequence. In the preferred embodiments, the principal reaction hereof is performed upon the 17β-hydroxy or 17β-etherified hydroxy starting compounds.

In the estrogen series, treatment of, for example, the 17α-ethynyl-3,17-diol derivative with an appropriate carboxylic acid anhydride, such as acetic anhydride, in pyridine yields the 3-acyloxy-17β-hydroxy derivative selectively. Use of an acid anhydride in the presence of the corresponding acid and an acid catalyst, such as p-toluenesulfonic acid yields the 3,17β-diacyloxy derivative. This diester may then be selectively saponified as through the use of methanolic potassium bicarbonate to yield the corresponding 3-hydroxy-17β-acyloxy derivative. Similarly, etherification may be performed via the conventional procedures. Thus, treatment with dihydropyran in the presence of an acid catalyst such as p-toluenesulfonic acid, p-toluenesulfonyl chloride, dinitrobenzenesulfonic acid, or the like yields the corresponding tetrahydropyran-2-yloxy derivative. Formation of the mono-tetrahydropyranol ether may be accomplished by selective protection of other hydroxy groups as through ester formation, in the manner described above, with alkaline hydrolysis of such ester groups after formation of the ether, if desired. Formation of 3-methoxy derivatives may likewise be realized through the use of dimethylsulfate and potassium hydroxide in the conventional manner.

Similar conventional esterification and etherification procedures can be employed in the other series of starting compounds for the present invention. For example, in the preparation of the 3β,17β-diacylate starting materials for the process hereof, the 3,17-dioxo compound can be reduced and acylated with about one chemical equivalent of acylating agent. The product mixture is then chromatographed to separate the 3β-acylate-17β-ol compound. This derivative is then oxidized to the 3β-acylate-17-oxo compound. The Grignard method of introducing the etherified propynyl group at C–17α, as described above, is then followed including the addition of the appropriate acylating before workup to form the 3β,17β-diacylate-17α-etherified propynyl compound. These compounds are utilized as starting compounds or are converted to the other 17α-(3-substituted propynyl) starting compounds hereof.

The 3β,17β-diethers can be conveniently formed by initially preparing the 3β,17β-diethers and following this with the formaldehyde method of preparing the 17α-(hydroxypropynyl) compounds, as described above. These compounds can then be etherified with dihydrofuran, dihydropyran, or 4-methoxy-5,6-dihydro-2H-pyran.

If a mixed ester-ether compound is desired, the monoether is prepared in a sequence similar to that used for preparing the mono-acylate. Thereafter, the described Grignard method is followed ending with an acylation before workup. Alternatively, the mono-acylate, prepared as described above, can be ethynylated at C–17α and the C–17β hydroxyl etherified. Thereafter, the described formaldehyde method is employed for the preparation of the corresponding 17α-(hydroxypropynyl) compound which can be etherified as described above.

In the preferred embodiments, the principal reaction hereof is conducted upon a starting compound having the 17α-(3-bromopropynyl) group in combination with lower alkoxy at the C–17β position.

The 17β-lower alkoxy ethers are prepared by treating the C–17β alcohol with alkali metal alkoxide, such as sodium methoxide, and the corresponding alkyl iodide in the presence of dimethylsulfoxide or with alkali metal hydride and alkyl-iodide. The 17β-lower alkoxymethyleneoxy ethers are prepared by treating the C–17β alcohol with chloromethyl lower alkyl ether of the formula lower alkyl—O—CH$_2$—Cl, and a tertiary amine or with alkali metal hydride. Upon practicing the principal reaction hereof, the 17β-ethers can be hydrolyzed such as with conc. hydrogen chloride in methanol or other conventional ether cleaving methods such as with hydrogen bromide in acetic acid or boron trichloride or bromide in inert solvent. The 17β-ol can then be conventionally re-etherified or esterified, as described above.

In the present specification and claims, the term "lower alkyl" denotes a straight or branched chain saturated hydrocarbon group containing from 1 to 4 carbon atoms and 1 and 2 and 3 and 4 carbon atoms and 1 to 2 to 3 to 4 carbon atoms, such as methyl, ethyl propyl, and butyl and the various isomers thereof. The expression "conventional hydrolyzable ester or ether" as used refers to those hydrolyzable ester groups and labile ether groups conventionally employed in the pharmaceutical art such as acetate, propionate, butyrate, trimethylacetate, valerate, methylethylacetate, caproate, t-butylacetate, 3-methylpentanoate, enanthate, caprylate, triethylacetate, pelargonate, decanoate, undecanoate, benzoate, phenylacetate, diphenylacetate, cyclopentylpropionate, methoxyacetate, aminoacetate, diethylaminoacetate, trichloroacetate, β-chloropropionate, bicyclo[2.2.2]-octane-1-carboxylate, adamantoate, dihydrogen phosphate, dibenzyl phosphate, sodium ethyl phosphate, sodium sulfate, sulfate, tetrahydropyran-2-yl ester, tetrahydrofuran-2-yl ether, 4-methoxytetrahydropyran-4-yl ether, cyclopentylether, and the like. The term "lower alkoxy" refers to the group "lower alkyl-O" wherein "lower alkyl" is as defined above. The term "lower alkoxymethyleneoxy" refers to the group "lower alkyl—O—CH$_2$—O—," wherein "lower alkyl" is as defined above.

The following further illustrate the manner by which the present invention can be practiced and represent, in one aspect, the best mode for carrying out the invention. As such, however, they should be construed merely as illustrative and not as limitative upon the overall scope hereof.

PREPARATION 1

A solution is prepared by dispersing 29 grams of estr-4-ene-3,17-dione in 600 ml. of dioxane at room temperature with stirring. Ethyl orthoformate (60 ml.) and 1.8 grams of p-toluenesulfonic acid hydrate are added to the resultant mixture. The addition is conducted portionwise, with stirring, and at room temperature. After the addition is complete, the resulting reaction mixture is allowed to stand at room temperature for three and one-half hours. After this time, the resulting solution is poured into two liters of ice water. After this has been accomplished, the whole mixture is filtered to yield a crystalline material which is recrystallized from methylene chloride:methanol containing a few drops of pyridine to obtain the desired 3-ethoxyestr-3,5-dien-17-one product.

Propargyl alcohol (42 grams) is dispersed in 52 grams of 2,3-dihydropyran with stirring. While continuing the stirring at room temperature, phosphorus oxychloride (500 mg.) is added portionwise to the resultant solution. The reaction mixture rapidly becomes warm and is cooled intermittently in ice. After maintaining these conditions for two hours and then allowing the temperature of the reaction mixture to stabilize at room temperature, an aqueous solution of potassium hydroxide is added. The mixture is then extracted with ether and the ether extracts distilled under gradually increasing temperatures and gradually decreasing pressures to obtain the 3-tetrahydropyran-2'-yloxypropyne product.

The corresponding 3-tetrahydrofuran-2'-yloxypropyne and 3-(4'-methoxytetrahydropyran - 4' - yloxy)propyne products are similarly prepared upon substitution of 2,3-dihydrofuran and 4-methoxy-5,6-dihydro-2H-pyran for 2,3-dihydropyran.

To 12 g. of tetrahydropyran-2'-yloxypropyne are added 100 ml. of anhydrous tetrahydrofuran and 35 ml. of ethyl magnesium bromide. The reaction mixture is refluxed for 5 minutes and left at room temperature for 2 hours. Then, 10 g. of 3-ethoxyestra-3,5-diene-17-one in 150 ml. of anhydrous tetrahydrofuran are added, and the reaction mixture is kept at room temperature for 2 hours. It is then poured into a saturated ammonium chloride solution and extracted with methylene chloride, washed with water, dried and evaporated to dryness to yield 3-ethoxy-17α-(3 - tetrahydropyran - 2' - yloxypropynyl)-estra-3,5-dien-17β-ol.

In like manner are prepared 3-ethoxy-17α-(3-tetrahydrofuran-2'-yloxypropynyl)-estra-3,5-dien-17β-ol, and 3-ethoxy-17α-(3-(4' - methoxytetrahydropyran - 4' - yloxy) propynyl)-estra - 3,5 - dien-17β-ol. The foregoing can be similarly practiced upon the other compounds of this invention to prepare the corresponding 17α-(3-tetrahydrofuran - 2' - yloxypropynyl), 17α-(3-tetrahydropyran-2'-yloxypropynyl), and 17α-(3-(4'-methoxytetrahydropyran-4'-yloxy)propynyl) starting compounds hereof.

If, after the reaction period above described, the reaction mixture is cooled in ice water and then mixed with 50 ml. of acetic anhydride and left at room temperature for 16 hours followed by the workup as described, 3-ethoxy-17α-(3-tetrahydropyran - 2' - yloxypropynyl)-17β-acetoxyestra-3,5-diene is prepared.

Ten grams of 3-ethoxy - 17α - (3-tetrahydropyran-2'-yloxypropynyl)-estra-3,5-diene-17β-ol is dissolved in 100 ml. of dimethylsulfoxide and treated at room temperature with 10 g. of sodium methoxide. The mixture is cooled and 10 ml. of methyl iodide is slowly added and the mixture stirred for 10 minutes. The mixture is then poured into water, extracted with methylene chloride, dried, filtered, and evaporated to give 3-ethoxy-17α-(3-tetrahydropyran-2'-yloxypropynyl)-17β-methoxyestra-3,5-diene.

In like manner, the other 17β-lower alkoxy ethers are prepared from the respective starting compounds.

The corresponding 17β - methoxymethyleneoxy compound is prepared by dispersing 1 g. of 3-ethoxy-17α-(3-tetrahydropyran - 2' - yloxypropynyl)-estra-3,5-dien-17β-ol in 50 ml. of anhydrous collidine at room temperature. To the resulting solution are added 5 ml. of chloromethyl methyl ether portionwise with stirring and at 5° C. under a nitrogen atmosphere. Following the addition, the temperature of the resulting mixture is raised to its boiling point and maintained under reflux for a period of 10 hours. After this time, the reaction mixture is poured into water and the aqueous mixture extracted with ethyl acetate. The ethyl acetate extracts are washed with water and then dried over sodium sulfate. The dried extracts are evaporated to dryness and the residue chromatographed on alumina to obtain the 3-ethoxy-17α-(3-tetrahydropyran - 2' - yloxypropynyl) - 17β - methoxymethyleneoxyestra-3,5-diene.

In like manner, the other 17β-lower alkoxymethyleneoxy ethers are prepared from the respective starting compounds.

PREPARATION 2

3-ethoxy-17α-(3-tetrahydropyran - 2' - yloxypropynyl)-estra-3,5-dien-17β-ol (18 g.) is dissolved in 750 ml. of methanol at room temperature. Thereafter, 20 g. of oxalic acid is dispersed in 150 ml. of water and the resultant aqueous oxalic acid solution is added to the steroid methanol solution at room temperature in a portionwise fashion. The resulting reaction mixture is left overnight at room temperature. The reaction mixture is then neutralized by the portionwise addition of sodium hydroxide and the neutralized mixture is filtered. The filtrate is concentrated in vacuum to a residue. The residue is extracted with an ether:methylene chloride mixture to provide a solution which is then dried over sodium sulfate. The dried solution is evaporated to obtain a solid. The solid is chromatographed on a column of silica gel eluting with hexane:ethyl acetate to obtain a substance which is recrystallized from ethyl acetate:hexane to obtain the 17α-(3-hydroxypropynyl) - estr - 4 - en-17β-ol-3-one product.

Likewise, the corresponding 17β-acetate is prepared from the 17β-acetoxy starting compound. The 17β-lower alkoxy ethers are prepared using the 17β-alkoxy starting compounds. Similarly, the 17β-lower alkoxymethyleneoxy compounds are prepared.

PREPARATION 3

A mixture of 20 ml. of absolute pyridine, 8 ml. of freshly distilled thionyl chloride, and 90 ml. of absolute tetrahydrofuran is prepared at room temperature with stirring. 17α - (3 - hydroxypropynyl) - estr-4-en-17β-ol-3-one (3.4 g.) which is dissolved in 50 ml. of anhydrous tetrahydrofuran are added to the resulting solution over a 25 minute period at room temperature. After the addition is complete, the reaction mixture is stirred at room temperature for 35 minutes. After this period of time, the mixture is poured into ice water and the resulting mixture is extracted with ether:methylene chloride. The extracts are washed with water and dried over sodium sulfate. The dried material is evaporated to an oil. The oil is chromatographed on silica gel to obtain the desired 17α-(3-chloropropynyl)-estr-4-en-17β-ol-3-one product.

A solution of 17α-(3-hydroxypropynyl)-17β-acetoxyestr-4-en-3-one (3.5 g.) and triphenylphosphine (4.2 g.) in dimethylformamide (26.7 ml.) containing carbon tetrachloride (1.1 ml.) is heated at 110° for 15 minutes and then the solvent is evaporated under reduced pressure. The residue is dissolved in hexane-ether (3:1) and chromatographed on 140 g. of silica gel. Elution was ether-hexane (2:1) and crystallization of the pooled crystalline fractions from hexane furnishes 17α - (3 - chloropropynyl) - 17β-acetoxyestr-4-en-3-one.

In like manner, the foregoing procedures can be practiced on the corresponding 18-alkyl compounds thus providing as final compounds, 17α-(3-chloropropynyl)-18-methylestr-4-en-17β-ol-3-one, 17α-(3-chloropropynyl)-18-ethylestr-4-en-17β-ol-3-one, 17α-(3-chloropropynyl)-18-n-propylestr-4-en-17β-ol-3-one and the 17β-methoxy and methoxymethyleneoxy ethers corresponding thereto.

PREPARATION 4

To a slurry of 0.18 g. of sodium hydride in 10 ml. of dry diethyleneglycol dimethyl ether under a dry nitrogen atmosphere is slowly added 1.0 g. of 3-methoxy-17α-ethynyl-estra-1,3,5(10)-trien-17β-ol in 10 ml. of dry diethyleneglycol dimethyl ether in a dropwise fashion over a 20 minute period. To this mixture is added dropwise, 0.9 g. of 2-chlorotetrahydropyran over a 10 minute period. This mixture is stirred at room temperature for an additional 30 minutes and then cautiously added to an ice-water mixture with stirring. The organic phase is extracted with diethyl ether, dried and evaporated under reduced pressure to yield 3-methoxy-17α-ethynyl-17β-tetrahydropyran-2'-yloxyestra-1,3,5(10)-triene which may be further purified via recrystallization from acetone:hexane.

A solution of 2.5 g. of phenyllithium in 25 ml. of diethyl ether is prepared. While maintaining this solution at room temperature, 10 g. of 3-methoxy-17α-ethynyl-17β-tetrahydropyran-2'-yloxyestra-1,3,5(10)-triene are added thereto to provide a solution containing 3-methoxy-17α-ethynyllithium - 17β - tetrahydropyran - 2' - yloxyestra-1,3,5(10)-triene. To the resulting solution is added, portionwise and with stirring 0.75 g. of paraformaldehyde. The addition is conducted at a rate to maintain gentle reflux of the solution. After the addition, the mixture is stirred for 20 hours, and then poured into water and extracted with ether. The ether extracts are washed with water, dried and evaporated to obtain the 3-methoxy-17α-(3-hydroxypropynyl)-17β - tetrahydropyran-2'-yloxyestra-1,3,5(10)-triene product.

3-methoxy-17α-(3-hydroxypropynyl) - 17β-tetrahydropyran-2'-yloxyestra-1,3,5(10)-triene (1 g.) is dispersed in 50 ml. of anhydrous ether at room temperature with stirring. To the resultant solution is added 1.5 ml. of purified thionyl chloride. The addition is conducted portionwise at 0° C. The resulting reaction mixture is then allowed to stand at 0° C. for a period of 6 minutes after which time it is washed with aqueous sodium bicarbonate solution followed by water. The washed material is then dried over sodium sulfate and evaporated to dryness to obtain the 3-methoxy-17α-(3-chloropropynyl) - 17β-tetrahydropyran-2'-yloxyestra-1,3,5(10)-triene product which is recrystallized from ether:ethyl acetate.

To a solution of 1 g. of 3-methoxy-17α-(3-chloropropynyl)-17β-tetrahydropyran-2' - yloxyestra-1,3,5(10)-triene in 30 ml. of dioxane is added 0.5 ml. of 2 N hydrochloric acid. The mixture is allowed to stand 5 hours at room temperature and then diluted with ice water and extracted with methylene chloride. The extracts are washed with water to neutrality dried over sodium sulfate, and evaporated to dryness to yield 3-methoxy-17α-(3-chloropropynyl)-estra-1,3,5(10)-trien-17β-ol which is recrystallized from acetone:hexane.

PREPARATION 5

17α - (3 - hydroxypropynyl) - estr - 4 - en - 17β - ol (1.5 g.) is dissolved into 75 ml. of toluene. The resulting solution is mixed with 2 g. of benzenesulfonyl fluoride. The reaction mixture is then heated to a temperature ranging from 80° C. to 90° C. and for a period of 4 hours. At the end of this reaction period, the mixture is cooled and then poured into ice water. The organic layer is then washed with a sodium bicarbonate solution and then with water and, following the washings, is dried over sodium sulfate. Solvent is then removed by evaporation and the remaining residue is recrystallized from ether to obtain the 17α-(3-fluoropropynyl)-estr - 4 - en - 17β-ol product.

PREPARATION 6

17α - (3 - bromopropynyl)-androst-4-en-17β-ol-3-one is prepared by substituting thionyl bromide for thionyl chloride or carbon tetrabromide for carbon tetrachloride in Preparation 3. Likewise, by employing the appropriate starting compounds, the corresponding 18-methyl, -ethyl, and -propyl derivatives are prepared. Similarly, these procedures are applicable in the preparation of the 17α-(bromopropynyl) derivatives in the estrogen and estrane series including those in the 17β-methoxy and -methoxymethyleneoxy series.

PREPARATION 7

A mixture of 1 g. of 17α-(3-hydroxypropynyl)-17β-acetoxyestr-4-en-3-one, 4 ml. of pyridine and 2 ml. of acetic anhydride is allowed to stand at room temperature for 15 hours. The mixture is then poured into ice water and the solid which forms is collected by filtration, washed with water and dried to yield 17α-(3-acetoxypropynyl)-17β-acetoxyestr-4-en-3-one which may be further purified through recrystallization from acetone:hexane.

Similarly, 17α-(3-propionyloxypropynyl)-17β-acetoxyestr-4-en-3-one is prepared by substituting propionic anhydride for acetic anhydride in the foregoing procedure. Likewise the corresponding 17α-(3-acetoxypropynyl) and 17α-(3-propionyloxypropynyl) derivatives of the other 17α-(3-hydroxypropynyl) starting compounds of the present invention are prepared.

Also prepared are the corresponding 17α-(3-butyryloxypropynyl), -(3-pentanoyloxypropynyl), -(3-hexanoyloxy), and -(3-heptanoyloxypropynyl) derivatives.

PREPARATION 8

A solution of 3-tetrahydropyran-2'-yloxyprop-1-yne (7.1 g.) in dry tetrahydrofuran (50 ml.) is added to a solution of ethylmagnesium bromide prepared from ethyl bromide (4.0 g.) and magnesium turnings (0.9 g.) in tetrahydrofuran (75 ml.). The reaction mixture is heated under reflux for 5 minutes and after being allowed to stand at room temperature for 30 minutes it is treated with a solution of 3-ethoxyestra-3,5-dien-17-one (5.0 g.) in dry tetrahydrofuran (65 ml.). After 8 hours, acetyl chloride (20 ml.) is added and the reaction mixture is kept at room temperature for 18 hours and then poured into water. The crude product, isolated by extraction with methylene dichloride, is dissolved in methanol (15 ml.) containing 0.25 ml. of concentrated hydrochloric acid and the resulting solution heated under reflux for 10 minutes. Addition of water (200 ml.) and isolation by extraction with methylene dichloride furnishes a crystalline solid which is purified by chromatography over Florisil (200 g.). Elution with ethyl acetate-hexane (1:4) gives 17α - (3-hydroxypropynyl)-17β-acetoxyestr-4-en-3-one after crystallization from ether.

The thus prepared compound is treated in accordance with the chlorination procedures of Preparation 3 or Preparation 6 to give 17α-(3-chloropropynyl)-17β-acetoxyestr-4-en-3-one. In a similar manner but with elimination of the acetyl chloride treatment step, 17α-(3-chloropropynyl)-estr-4-en-17β-ol-3-one is prepared. The bromo compounds are also thus prepared.

In accordance with the above procedures, 17α-(3-chloropropynyl)-17β-acetoxy - 18 - methylestr-4-en-3-one, 17α - (3-chloropropynyl)-18-methylestr-4-en-17β-ol-3-one, 6,6-difluoro - 17α - (3-chloropropynyl)-17β-acetoxyestr-4-en-3-one, 6,6-difluoro-17α(3-chloropropynyl)-estr-4-en-17β-ol-3-one, 6,6-difluoro-17α-(3 - chloropropynyl)-17β-acetoxy-18-methylestr-4-en-3-one, and 6,6-difluoro-17α-(3-chloropropynyl)-18-methylestr-4-en-17β-ol-3-one are prepared from the respective starting compounds. The 17β-ol compounds can also be prepared upon final base hydrolysis of the 17β-acetate products.

PREPARATION 9

A stream of perchloryl fluoride is passed through a solution of 1 g. of 3-ethoxyestra-3,5-dien-17-one in 25 ml. of dimethylformamide, cooled to 0° C., for 5 minutes. After being allowed to slowly attain a temperature of 20° C., the solution is poured into water and extracted with ethyl acetate. These extracts are washed with saturated aqueous sodium bicarbonate solution and with water to neutrality, dried over sodium sulfate and evaporated to dryness. The residue is then chromatographed on alumina to yield a mixture of the 6α-fluoro and 6β-fluoro isomers. To the mixture in 7.5 ml. of anhydrous, peroxide-free dioxane is added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxy-6-fluoroestra-3,5-dien-17-one which is recrystalized from acetone:hexane.

A stream of perchloryl fluoride is passed through a solution of 1 g. of 3-ethoxy-6-fluoroestra-3,5-dien-17-one in 25 ml. of dimethylformamide, cooled to 0° C., for 5 minutes. After being allowed to slowly attain a temperature of 20° C., the solution is poured into water and extracted with ethyl acetate. These extracts are washed with saturated aqueous sodium bicarbonate solution and with water to neutrality, dried over sodium sulfate and evaporated to dryness. The residue is then chromatographed on alumina to provide 6,6-difluoroestr-4-ene-3,17-dione product on recrystallization from acetone:hexane.

In like manner 6,6-difluoroandrost-4-ene-3,17-dione, 6,6-difluoro-18-methylestr-4-ene-3,17-dione, 6,6-difluoro-18-methylandrost-4-ene-3,17-dione, 6,6-difluoro-18-ethylestr-4-ene-3,17-dione, 6,6-difluoro-18-ethylandrost-4-ene-3,17-dione, 6,6-difluoro-18-propylestr-4-en-17-one, and 6,6-difluoro-18-propylandrost-4-ene-3,17-dione are prepared from the respective starting compound.

PREPARATION 10

To a boiling solution of 72 ml. of methyl magnesium bromide in ether (3 M) in 190 ml. of anhydrous tetrahydrofuran there is added a solution of 12 grams of 3,3-ethylenedioxy-17α-ethynylandrost-5-en-17β-ol in 60 ml. of anhydrous tetrahydrofuran. When the addition is complete, a further 24 ml. of ethereal methylmagnesium bromide is added. The mixture is allowed to reflux for 16 hours. A further 24 ml. of Grignard reagent is then added and reflux is continued for an additional 24 hours. The reaction mixture is then cooled to room temperature and poured into Dry Ice and allowed to stand for 65 hours. The mixture is then poured into water and neutralized with dilute hydrochloric acid and extracted with ethyl acetate. The organic layer is washed several times with a saturated aqueous solution of sodium bicarbonate. To the bicarbonate extracts 30% aqueous hydrochloric acid is added carefully to an acid pH. The precipitate is filtered, washed with water and dried under vacuum to provide the 3,3-ethylenedioxy-17α-(3-carboxyethynyl)androst-5-en-17β-ol product.

To a stirred solution of 2 g. of 3,3-ethylenedioxy-17α-(3-carboxyethynyl)androst-5-ene-17β-ol in 250 ml. of absolute ether is added in a dropwise fashion and under nitrogen, an ethereal solution of 10 molar equivalents of methyl lithium. The mixture is then stirred for 48 hours at room temperature, poured into water, acidified with hydrochloric acid and stirred vigorously for 1 hour. The ethereal phase is separated, washed with water to neutrality, dried over sodium sulfate and evaporated to dryness to yield 3,3-ethylenedioxy-17α-(3,3-dimethyl-3-hydroxypropynyl)androst-5-en-17β-ol which is further purified through recrystallization from acetone:hexane.

In like manner, the foregoing procedure can be employed using ethyl lithium, propyl lithium, butyl lithium, pentyl lithium, and hexyl lithium so as to provide the corresponding 17α-(3,3-dialkyl-3-hydroxypropynyl)compounds. These procedures can be employed upon the other 17α-carboxyethynyl compounds prepared in the foregoing paragraph so as to prepare the corresponding 17α-(3,3-dialkyl-3-hydroxypropynyl)compounds.

Two milliliters of dihydropyran are added to a solution of 1 g. of 3,3-ethylenedioxy-17α-(3,3-dimethyl-3-hydroxyethynyl)androst-5-en-17β-ol in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 3,3-ethylenedioxy-17α - (3,3 - dimethyl-3-tetrahydropyran-2'-yloxypropynyl)androst-5-en-17β-ol which is recrystallized from pentane.

In like manner, the foregoing procedure can be practiced using dihydrofuran and 4-methoxy-5,6-dihydro-2H-pyran to prepare the corresponding tetrahydrofuran-2'-yloxy and 4-methoxytetrahydropyran-4'-yloxy compounds of the propynyl derivatives. The hydroxypropynyl compounds can also be treated in accordance with the foregoing procedures so as to prepare the corresponding 3-chloro, bromo, and fluoro propynyl compounds in 3,3-dialkyl series.

PREPARATION 11

A solution of 6 g. of 3-ethoxy-17α-(3-hydroxypropynyl) - 17β - tetrahydropyran-2'-yloxyandrost-3,5-diene in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 3-ethoxy-17α-(3-formylethynyl)-17β-tetrahydropyran - 2' - yloxy-androst-3,5-diene which may be further purified by recrystallization from acetone:hexane.

The compound prepared in the previous paragraph is treated with 1 molar equivalent of methyl lithium as set forth in paragraph two of Preparation 9 so as to prepare 3 - ethoxy - 17α - (3 - methyl-3-hydroxypropynyl)-17β-tetrahydropyran-2'-yloxyandrost-3,5-diene.

In like manner, the alkylation procedure of the foregoing paragraph can be practiced using one molecular equivalent of the alkyl lithium compound set forth in Preparation 9 so as to prepare the corresponding 17α-(3-alkyl-3-hydroxypropynyl) compounds. The 3-hydroxypropynyl compounds thus prepared can be etherified or converted to the corresponding 3-halo compounds as set forth in the foregoing procedures so as to prepare the corresponding 17α-(3-substituted-3-alklylpropynyl) compounds.

PREPARATION 12

A solution of 1 g. of sodium borohydride in 3 ml. of water is added to an ice-cooled solution of 1 g. of 6,6-difluoroestr-4-ene-3,17-dione in 120 ml. of methanol and the mixture is then allowed to stand for 16 hours at room temperature. The excess reagent is decomposed by the addition of acetic acid and the solution is then concentrated to a small volume in vacuo and diluted with water. The product is extracted with ethyl acetate and these extracts are washed with water, dried and evaporated to yield 6,6-difluoroestr-4-ene-3β,17β-diol which may be further purified by recrystallization from acetone:hexane.

A mixture of 3 g. of 6,6-difluoroestr-4-ene-3β,17β-diol, 10 ml. of pyridine and 0.9 ml. of acetic anhydride is allowed to stand at room temperature for 15 hours. The mixture is then poured into ice water and the solid which forms is collected by filtration, washed with water and dried to yield 3β,17β-diacetoxy-6,6-difluoroestr-4-ene, 3β-acetoxy-6,6-difluoroestr-4-en-17β-ol and 6,6-difluoro-17β-acetoxyestr-4-en-3β-ol which are separated by chromatography.

A solution of 6 g. of 3β-acetoxy-6,6-difluoroestr-4-en-17β-ol in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 3β-acetoxy-6,6-difluoroestr-4-ene-17-one which may be further purified by recrystallization from acetone:hexane.

The thus prepared derivative is treated in accordance with the procedures set forth above to prepare the 3β-acetoxy - 6,6 - difluoro - 17α-(3-tetrahydropyran-2'-yloxypropynyl)estr-4-en-17β-ol which is converted to the corresponding 17α-(3-hydroxypropynyl) and 17α-(3-halopropynyl) derivatives via the procedures set forth above. Also thus prepared is 3β,17β-diacetoxy-6,6-difluoro-17α-(3-halopropynyl)androst-4-ene and 3β,17β-diacetoxy-6,6-difluoro - 17α - (3-hydroxypropynyl)-androst-4-ene and 3β,17β - diacetoxy - 6,6-difluoro-17α-(3-tetrahydrofuran-2' - yloxypropynyl)-androst-4-ene and 3β,17β-diacetoxy-6,6 - difluoro - 17α - (3,4' - methoxytetrahydropyran-4'-yloxy)propynyl)androst-4-ene.

Substitution of an alternate carboxylic acid anhydride in the above procedures affords the corresponding acylates, for example, the propionates, benzoates, pentanoates, and adamanatoates, for example:

3β-propionyloxy-6,6-difluoro-17α-(3-halopropynyl)-19-norandrost-4-en-17β-ol,
3β-benzoyloxy-17α-(3-hydroxypropynyl)-18-methylestra-ethylestr-4-en-17β-ol,
3β-propionyloxy-6,6-difluoro-17α-(3-hydroxypropynyl)-androst-4-en-17β-ol,
3β-benzoyloxy-17α-(3-tetrahydropyran-2'-yloxypropynyl)-estra-4,9(10),11-trien-17β-ol,
3β-benzoyloxy-17α-(3-hydroxypropynyl)-18-methylandrost-4-en-17β-ol,
3β-benzoyloxy-17α-(3-hydroxypropynyl)-18-methylestra-4,9(10),11-trien-17β-ol, and
3β-adamantoyloxy-17α-(3-halopropynyl)-18-methylestr-5(10)-en-17β-ol, and so forth.

PREPARATION 13

A solution of 2 g. of 6,6-difluoroestr-4-ene-3,17-dione in 20 ml. of anhydrous tetrahydrofuran is cooled to —75° C. in a Dry Ice-acetone bath and treated with a previously cooled solution of 0.6 g. of lithium tri-t-butoxy aluminum hydride in 20 ml. of anhydrous tetrahydrofuran. After maintaining the reaction mixture at reflux for 15 minutes it is cooled and poured into ice water and extracted several times with ethyl acetate. These extracts are washed with water to neutrality, dried over anhydrous sodium sulfate and evaporated to dryness to yield 6,6-difluoroestr-4-ene-3β,17β-diol.

To a slurry of 1.0 g. of sodium hydride in 10 ml. of dry diethyleneglycol dimethyl ether under a dry nitrogen atmosphere is slowly added 1.0 g. of 6,6-difluoroestr-4-ene-3β,17β-diol in 10 ml. of dry diethyleneglycol dimethyl ether in a dropwise fashion over a 20 minute period. To this mixture is added dropwise 0.9 g. of 2-chlorotetrahydropyran over a 10 minute period. The mixture is then stirred at room temperature for an additional 30 minutes and then cautiously added to an ice-water mixture with stirring. The organic phase is extracted with diethyl ether, dried and evaporated under reduced pressure to yield 3β,17β-bis(tetrahydropyran-2'-yloxy) - 6,6 - difluoroestr-4 - ene, 3β - tetrahydropyran-2'-yloxy-6,6-difluoroestr-4-en - 17β - ol and 6,6 - difluoro - 17β-tetrahydropyran-2'-yloxyestr-4-en-3β-ol which are separated by chromatography on alumina.

Substitution of dihydrofuran in the above procedure prepares the corresponding tetrahydrofuran-2'-yloxy derivatives.

A solution of 6 g. of 3β-tetrahydropyran-2'-yloxy-6,6-difluoroestr-4-en-17β-ol in 120 ml. of pyridine is added to a mixture of 5 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 3β-tetrahydrofuran-2'-yloxy - 6,6 - difluoroestr-4-en-17-one which may be further purified by recrystallization from acetone:hexane.

To a solution of 1 gram of lithium aluminum hydride in 100 ml. of anhydrous tetrahydrofuran is continuously bubbled a slow current of purified acetylene for one hour. Thereafter, 1 gram of 3β-tetrahydropyran-2'-yloxy-6,6-difluoroestr-4-en-17-one in 10 ml. of tetrahydrofuran is added and the reaction mixture stirred at room temperature for four hours. Eight milliliters of water is then added and the mixture is stirred for 30 minutes. The mixture is then filtered and the organic filtrate evaporated to yield 3β-tetrahydropyran-2'-yloxy-6,6-difluoro-17α-ethynylestr-4-en-17β-ol which is recrystallized from acetone-hexane.

Similarly, 3β-tetrahydrofuran - 2' - yloxy-6,6-difluoro-17α-ethynylestr-4-ene-17β-ol, is prepared.

The thus prepared 3-β-tetrahydropyran-2'-yloxy and 3β-tetrahydrofuran-2'-yloxy compounds are then treated in accordance with the above procedures to prepare:

3β-tetrahydropyran-2'-yloxy-6,6-difluoro-17α-(3-tetrahydrofuran-2'-yloxypropynyl)estr-4-en-17β-ol,
3β-tetrahydropyran-2'-yloxy-6,6-difluoro-17α-(3-tetrahydrofuran-2'-yloxypropynyl)-18-methylestr-4-en-17β-ol,
3β-tetrahydropyran-2'-yloxy-6,6-difluoro-17α-(3-tetrahydropyran-2'-yloxypropynyl)estra-4-en-17β-ol,
3β-tetrahydropyran-2'-yloxy-6,6-difluoro-17α-(3-tetrahydropyran-2'-yloxypropynyl)-18-methylestr-4-en-17β-ol,
3β-tetrahydropyran-2'-yloxy-6,6-difluoro-17α-(3-(4'-methoxytetrahydropyran-4'-yloxy)propynyl)estr-4-en-17β-ol,
3β-tetrahydropyran-2'-yloxy-6,6-difluoro-17α-(3-(4'-tetrahydropyran-4'-yloxy)propynyl)18-ethylestr-4-en-17β-ol,
3β-tetrahydropyran-2'-yloxy-6,6-difluoro-17α-(3-halopropynyl)estr-4-en-17β-ol, and the corresponding 3β-tetrahydrofuran-2'-yloxy compounds thereof.

The thus prepared 3β-monoethers can then be acylated as described above to prepare the mixed ester-ether derivatives. Thus formed, for example, are:

3β-tetrahydropyran-2'-yloxy-6,6-difluoro-17α-(3-tetrahydropyran-2'-yloxypropynyl)-17β-acetoxyestr-4-ene,
3β-tetrahydrofuran-2'-yloxy-17α-(3-tetrahydropyran-2'-yloxypropynyl)-17β-acetoxy-18-methylestr-4-ene,
3β-tetrahydropyran-2'-yloxy-6,6-difluoro-17α-(3-tetrahydropyran-2'-yloxypropynyl) - 17β - acetoxyandrost-4-ene,
3β-tetrahydrofuran-2'-yloxy-6,6-difluoro-17α-(3-tetrahydropyran-2'-yloxypropynyl)-17β-acetoxy-18-methylestr-4-ene,
3β-tetrahydropyran-2'-yloxy-6,6-difluoro-17α-(3-tetrahydropyran-2'-yloxypropynyl)-17β-propionyloxyestr-4-ene,
3β-tetrahydro-pyran-2'-yloxy-6,6-difluoro-17α-(3-tetrahydropyran-2'-yloxypropynyl)-17β-propionyloxyandrost-4-ene,
3β-tetrahydrofuran-2'-yloxy-6,6-difluoro-17α-(3-tetrahydropyran-2'-yloxypropynyl)-17β-caproyloxyestr-4-ene,
3β-tetrahydrofuran-2'-yloxy-6,6-difluoro-17α-(3-tetrahydropyran-2'-yloxypropynyl)-17β-caproyloxy-18-ethylestr-4-ene,
3β-tetrahydropyran-2'-yloxy-6,6-difluoro-17α-(3-tetrahydropyran-2'-yloxypropynyl)-17β-caproyloxyandrost-4-ene,
3β-tetrahydrofuran-2'-yloxy-6,6-difluoro-17α-(3-tetrahydropyran-2'-yloxypropynyl)-17β-caproyloxy-18-propylestr-4-ene, and so forth, as well as the corresponding 17α(3-halopropynyl) compounds.

PREPARATION 14

The compound 3β-acetoxy-6,6-difluoroestr-4-en-17-one is treated in accordance with the procedure as set forth above to prepare 3β-acetoxy-6,6-difluoro-17α-ethynylestr-4-ene-17β-ol. This compound is then etherified to prepare the corresponding 3β - acetoxy-6,6-difluoro-17α-ethynyl-17β - tetrahydropyran-2'-yloxyestr-4-ene and 3β-acetoxy-6,6-difluoro-17α-ethynyl - 17β - tetrahydrofuran-2'-yloxyestr-4-ene.

In like manner, the foregoing procedures can be followed with other starting 3β-acylated described in the foregoing procedures.

PREPARATION 15

A mixture of 1 g. of 6,6-difluoroestr-4-en-17β-ol-3-one, 25 ml. of dry benzene, 5 ml. of ethylene glycol and 50 mg. of p-toluenesulfonic acid monohydrate is refluxed for 16 hours using a water separator. The reaction mixture is then washed with aqueous sodium bicarbonate solution and water, dried and evaporated to dryness to yield 3,3-ethylenedioxy-6,6-difluoroestr-4-en-17β-ol which is recrystallized from acetone:hexane.

The corresponding 3,3-ethylenedioxy-6,6-difluoroestr-4-en-17-one compound is prepared by oxidation with chromic acid in pyridine and is converted to 3,3-ethylenedioxy-6,6-difluoro - 17α - (3 - tetrahydropyran-2'-yloxypropynyl)estr-4-ene-17β-ol via the procedure given above in Preparation 1.

A mixture of .05 g. of 3,3-ethylenedioxy-6,6-difluoro-17α-(3-tetrahydropyran - 2' - yloxypropynyl)estr-4-ene-17β-ol in 25 ml. of acetone and 0.1 ml. of concentrated hydrochloric acid is allowed to stand at room temperature for 15 hours and is then poured into water. This mixture is extracted with methylene chloride and the extracts are in turn washed with water to neutrality, dried over sodium sulfate and evaporated to dryness, to yield 6,6-difluoro-17α-(3 - hydroxypropynyl)estr - 4 - ene-17β-ol-3-one which may be recrystallized from acetone:hexane.

A mixture of 1 g. of 6,6-difluoro-17α-(3-hydroxypropynyl)estr-4-ene-17β-ol-3-one, 4 ml. of pyridine and 2 ml. of acetic anhydride is allowed to stand at room temperature for 15 hours. The mixture is then poured into ice water and the solid which forms is collected by filtration, washed with water and dried to yield 6,6-difluoro-17α-(3-acetoxypropynyl-estr-4-ene-17β - ol - 3 - one which may be further purified through recrystallization from acetone:hexane.

Two milliliters of dihydropyran are added to a solution of 1 g. of 6,6-difluoro-17α-(3-acetoxypropynyl)estr-4-en-17β-ol-3-one in 15 ml. of benzene. About 1 ml. is removed by distillation to remove moisture and 0.4 g. of p-toluene-sulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane to yield 6,6 - difluoro-17α-(3-acetoxypropynyl)-17β-tetrahydropyran-2'-yloxyestr - 4 - ene-3-one which is recrystallized from pentane.

In like manner, routine experimentation in accordance with the foregoing procedures prepares the other 17α-(3-acyloxypropynyl) compounds such as propionyloxy, butryloxy, and the like and the other 17β-ethers for example, tetrahydrofuran-2-yloxy, and the like compounds of the present invention. For example, 6,6-difluoro-17α-(3-propionyloxypropynyl) - 17β - (4' - methoxytetrahydropyran-4'-yloxy) - 18 - methylestr-4-ene-3-one is prepared.

PREPARATION 16

Five grams of 17α-(3-hydroxypropynyl)-ester-4-en-17β-ol-3-one are added portionwise to a mixture of 6 g. of triphenylphosphine, 2 ml. of carbon tetrachloride, and 50 ml. of dimethylformamide at room temperature and with stirring. The resulting mixture is then heated at 110° C. and maintained thereat for 15 minutes. The mixture is then poured into ice water and the aqueous mixture is then poured into ice water and the aqueous mixture extracted with methylene chloride:ether. The extracts are dried and evaporated to obtain the 17α-(3-chloropropynyl)-ester-4-en-17β-ol-3-one product.

Use of carbon tetrabromide prepares the corresponding 17α-(3-bromopropynyl) compounds.

PREPARATION 17

Cuprous iodide (10.4 grams) is dispersed in 200 ml. of diethyl ether at ice bath temperatures and under nitrogen atmosphere. To the resultant solution is added a methyl lithium solution in a dropwise fashion to the vigorously stirred suspension of cuprous iodide. The addition is continued until the solution is colorless, thus providing a solution of lithium dimethyl copper reagent.

In a similar manner, the lithium diethyl copper, lithium di-n-propyl copper, lithium diisopropyl copper, lithium di-n-butyl copper, lithium diisobutyl copper, lithium di-sec-butyl copper, and lithium di-t-butyl copper reagents are prepared.

PREPARATION 18

The following procedures illustrate the manner by which the 17α-(3-iodopropynyl) starting compounds are prepared by halogen exchange with sodium iodide.

A mixture of 1 g. of 17α-(3-bromopropynyl)-17β-acetoxyestr-4-en-3-one in 50 ml. of dry methylethyl ketone containing 1 g. of sodium iodide is refluxed for 10 hours. After this time, the reaction mixture is poured into water and the resultant mixture extracted with ether. The ether extracts are washed with water, dried, and evaporated at 20° C. in vacuum to give 17α-(3-iodopropynyl)-17β-acetoxyestr-4-en-3-one.

In like manner, the 17α-(3-chloropropyl) starting compounds are converted to the corresponding 17α-(3-iodopropynyl) compounds. The foregoing reaction is repeated using acetone in lieu of methylethyl ketone, with similar results.

In like manner, the foregoing procedure is useful for the preparation of the 17α-(3-iodopropynyl) compounds in the 17β-lower alkoxy and 17β-lower alkoxymethyleneoxy series.

PREPARATION 19

To a suspension of 1 g. of 17α-ethylnylestr-4-en-17β-ol-3-one in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxy-17α-ethynylestra-3,5-dien-17β-ol which is recrystallized from acetone:hexane.

To a slurry of 1.0 g. of sodium hydride in 10 ml. of dry diethyleneglycol dimethyl ether under a dry nitrogen atmosphere is slowly added 1.0 g. of 3-ethoxy-17α-ethynylestra-3,5-dien-17β-ol in 10 ml. of dry diethyleneglycol dimethyl ether in a dropwise fashion over a 20 minute period. To this mixture is added dropwise, 0.9 g. of 2-chlorotetrahydropyran over a 10 minute period.

The mixture is stirred at room temperature for an additional 30 minutes and then cautiously added to an ice water mixture with stirring. The organic phase is extracted with diethyl ether, dried and evaporated under reduced pressure to yield 3-ethoxy-17α-ethynyl-17β-tetrahydropyran-2-yloxyestra-3,5-diene which may be further purified via recrystallization from acetone:hexane.

Similarly, the tetrahydrofuran-2-yloxy and 4-methoxytetrahydropyran-4-yloxy ethers are prepared by use of 2-chlorotetrahydrofuran and 4-methoxy-5,6-dihydro-2H-pyran, respectively.

A solution of 3-ethoxy-17α-ethynyl-17β-tetrahydropyran-2-yloxyestra-3,5-diene (1 g.) in 10 ml. of tetrahydrofuran is treated under reflux with 1.1 moles of sodium hydride for 2 hours. The reaction mixture is cooled to room temperature and a stream of formaldehyde is bubbled through the reaction mixture for 1 hour. Then, the mixture is poured into ice water and extracted with dichloromethane. After elimination of the solvent, the product is purified by crystallization of chromatography in neutral alumina giving 3-ethoxy-17α-(3-hydroxypropynyl)-17β - tetrahydropyran - 2-yloxyestra-3,5-diene.

Similarly, the other above 17β-ethers are prepared. The thus prepared compounds are then converted to the corresponding 17α-(3-bromopropynyl) compounds, as by the procedure of Preparation 6.

PREPARATION 20

3-tetrahydropyran-2'-yloxypropyne (31 g.) in 50 ml. of tetrahydrofuran is treated with 45 ml. of methyl magnesium bromide at room temperature for 1 hour. The mixture is then refluxed for 15 minutes. A solution of 28 g. of 3-methoxyestra-3,5-dien-17-one in 450 ml. of tetrahydrofuran is then added to the first solution at room temperature. The mixture is left 1 hour and then TLC in 25% ethyl acetate/75% hexane shows reaction to be complete. The mixture is poured into water, upper layer separated, diluted with methylene chloride, dried with anhydrous sodium sulfate and the solvent eliminated under reduced pressure to give 3-methoxy-17α-(3-tetrahydropyran-2'-yloxypropynyl)-estra-3,5-dien-17β-ol.

3,17β-dimethoxy-17α-(3 - tetrahydropyran-2'-yloxypropynyl)-estra-3,5-diene is prepared therefrom by the procedure of Preparation 1, paragraph 7.

The above material is dissolved in ca. 300 ml. of methanol and 50 ml. of water and treated with 3 cm.³ of concentrated hydrochloric acid at room temperature for 4 hours. TLC indicates reaction complete. Water is added and the methanol eliminated under reduced pressure to yield a residue which is filtered, washed with water and air dried to give 17α-(3-hydroxypropynyl)-17β-methoxyestr-4-en-3-one.

The above procedure is repeated with a 10 minute reaction period, with similar results.

One gram of 17α-(3-hydroxypropynyl)-17β-methoxyestr-4-en-3-one in 10 ml. of anhydrous methanol plus 1 ml. of trimethylorthoformate and ca. 100 mg. of p-toluenesulfonic acid is kept at room temperature for 10 minutes. The neutralizing with triethylamine in 25% ethyl acetate/75% hexane indicates reaction complete. The mixture is neutralized with triethylamine, poured into water, and extracted with methylene chloride, dried with anhydrous sodium sulfate and the solvent is eliminated under reduced pressure on the steam bath to give 3,17β-dimethoxy-17α-(3-hydroxypropynyl)-estra-3,5-diene.

The material from the above procedure is dissolved in 10 ml. of dimethylacetamide and then treated with 1.26 g. of triphenylphosphine and 1.5 g. of carbon tetrabromide. TLC after 15 minutes neutralizing with triethylamine shows the reaction substantially complete. The mixture is precipitated with concentrated sodium bicarbonate, extracted with methylenechloride, dried with sodium sulfate and the solvents eliminated under vacuum. The residue is leached with hexane and the extracts that contain mostly the desired compound are filtered through 20 g. silica in hexane switching to 5% methylenechloride/hexane and then to 100% methylenechloride to give 3,17β-dimethoxy-17α-(3-bromopropynyl)-estra-3,5-diene.

PREPARATION 21

Estrone methylether (25 g.) is dissolved in 375 ml. of anhydrous tetrahydrofuran. Tetrahydropyran-2'-yloxypropyne (27.5 g.) in 125 ml. of anhydrous tetrahydrofuran is treated with 66 ml. of methyl magnesium bromide under reflux conditions. When the reaction diminishes in intensity, the mixture is refluxed for 1 hour and then the steroid solution is added at room temperature. TLC in 25% ethylacetate/75% hexane after 30 minutes shows the reaction to be complete. The mixture is poured into water, extracted with ethyl acetate, dried over anhydrous sodium sulfate and the solvent eliminated under reduced pressure. Water present is azeotroped with benzene, high vacuum is applied and heating continued on the steam bath.

Ten grams of the material from the above procedure is dissolved in 100 ml. of dimethylsulfoxide and treated at room temperature with 10 g. of sodium methoxide. The mixture is then cooled and 10 ml. of methyl iodide are added slowly and the mixture stirred for 10 minutes. TLC in 25% ethyl acetate/45% hexane shows the reaction to be complete. The mixture is poured into water, extracted with methylene chloride, dried over anhydrous sodium sulfate and filtered, eliminating the solvent under reduced pressure.

The material from the above procedure is dissolved in ca. 500 ml. of hot methanol and treated with ca. 30 ml. of concentrated hydrochloric acid and 100 ml. of water, heating on the steam bath for ca. 20 minutes. TLC in 25% ethyl acetate/75% hexane shows the reaction to be complete. The solvent is eliminated under reduced pressure, and water is added and the mixture extracted with methylene chloride, washed with water and dried over anhydrous sodium sulfate. The solvent is eliminated under reduced pressure and the residue crystallized from methanol:water and then ether:hexane to give 3,17β-dimethoxy-17α-(3-hydroxypropynyl)-estra-1,3,5(10)-triene.

One gram of the above product in ca. 30 ml. of ether is treated with 1.3 g. of triphenylphosphine and 1.5 g. of carbon tetrabromide at room temperature for a period of 90 minutes. Dimethylacetamide (ca. 10 ml.) is added, and after ca. 60 minutes, the reaction is complete. Solvents are eliminated under reduced pressure, the residue is leached with hexane several times, and 0.1 ml. of sym-collidine added. Hexane is concentrated to dryness, dissolved in a small amount of ether and methanol added to give 3,17β-dimethoxy-17α-(3-bromopropynyl)-estra-1,3,5(10)-triene.

One gram of 3,17β - dimethoxy-17α-(3-hydroxpyropynyl)-estra-1,3,5(10)-triene, 10 ml. of dimethylacetamide, 1.3 g. of triphenylphosphine, and 1.5 g. of carbon tetrabromide is kept at room temperature. TLC after ca. 5 minutes shows reaction complete. The solvent is eliminated under reduced pressure and the residue leached several times with hexane. The hexane leaches are combined and concentrated to dryness. The residue is dissolved in a small amount of ether and methanol added to give 3,17β-dimethoxy-17α-(3-bromopropynyl)-estra-1,3,5(10)-triene.

In accordance with the foregoing procedures, the following compounds are prepared:

17α-(3-bromopropynyl)-17β-methoxyestr-5(10)-en-3-one,
17α-(3-bromopropnyl)-17β-methoxy-18-methylestr-(10)-en-3-one,
17α-(3-bromopropynyl)-17β-methoxyestr-4-en-3-one,
17α-(3-bromopropynyl)-17β-methoxy-18-methylestr-4-en-3-one,
6,6-difluoro-17α-(3-bromopropynyl)-17β-methoxyestr-4-en-3-one,
6,6-difluoro-17α-(3-bromopropynyl)-17β-methoxy-18-methylestr-4-en-3-one,
6,6-difluoro-17α-(3-bromopropynyl)-estr-4-en-17β-ol-3-one,
6,6-difluoro-17α-(3-bromopropynyl)-18-methylestr-4-en-17β-ol-3-one,
6,6-difluoro-17α-(3-bromopropynyl)-estr-4-ene-3β,17β-diol,
6,6-difluoro-17α-(3-bromopropynyl)-18-methylestr-4-ene-3β,17β-diol,
and the 17β - methoxymethyleneoxy ether compounds otherwise corresponding thereto.

Example 1

Six hundred milligrams of 3,3-ethylenedioxy-6,6-difluoro-17α-(3-bromopropynyl)-17β-tetrahydropyran-2'-yloxyestr-4-ene in 100 ml. of diethyl ether is added in a dropwise fashion to a stirred and cooled ice bath solution of 1.2 equivalents of lithium dimethyl copper reagent prepared in Preparation 17. The resultant mixture is stirred at ice bath temperatures for 5 hours after which time a saturated solution of ammonium chloride is added, the organic layer is separated and the aqueous layer extracted with ether. The ether extracts are dried over magnesium sulfate and filtered and the filtrate evaporated to obtain the 3,3-ethylenedioxy-6,6-difluoro-17α-(buta-1',2'-dien-3'-yl)-17β-tetrahydropyran-2'-yloxyestr-4-ene product.

A mixture of 0.5 g. of 3,3-ethylenedioxy-6,6-difluoro-17α - (buta - 1',2'-dien-3'-yl)-17β-tetrahydropyran-2'-yloxyestr-4-ene in 25 ml. of acetone and 0.1 ml. of concentrated hydrochloric acid is allowed to stand at room temperature for 15 hours and is then poured into water. This mixture is extracted with methylene chloride and the extracts are in turn washed with water to neutrality, dried over sodium sulfate and evaporated to dryness, to yield 6,6 - difluoro-17α-(buta-1',2'-dien-3'-yl)-estr-4-en-17β-ol-3-one which may be further recrystallized from acetone:hexane.

Example 2

A solution of 5 g. of 3,3-ethylenedioxy-17α-(3-chloro-3 - methylpropynyl)-17β-methoxymethyleneoxyestr-4-ene dispersed in 100 ml. of tetrahydrofuran are treated with 5 chemical equivalents of lithium dimethyl copper at −5° C. for one hour. After this time the reaction product is subjected to column chromatography (ether-hexane elution from silica gel) to provide the 3,3-ethylenedioxy-17α-(penta - 2',3'-dien-4'-yl)-17β-methoxymethyleneoxyestr-4-ene product.

A mixture of 0.5 g. of 3,3-ethylenedioxy-17α-(penta-2',3'-dien-4'-yl)-17β-methoxymethyleneoxyestr-4-ene in 25 ml. of acetone and 0.1 ml. of concentrated hydrochloric acid is allowed to stand at room temperature for 15 hours and is then poured into water. This mixture is extracted with methylene chloride and the extracts are in turn washed with water to neutrality, dried over sodium sulfate and evaporated to dryness, to yield 17α-(penta-2',3'-dien-4'-yl)-estr-4-en-17β-ol-3-one which may be recrystallized from acetone:hexane.

Example 3

To a solution of 0.005 molar equivalents of lithium di-n-butyl copper reagent in hexane at 0° C. is added with stirring a solution of 0.001 mole of 6,6-difluoro-17α-(3-bromopropynyl)-17β-ethoxyestr-4-en-3β-ol in 100 ml. of ether. The reaction mixture is allowed to stand for one half hour at 0° C. and then allowed to warm to room temperature with stirring over a period of 4.5 hours. The reaction mixture is treated with a saturated solution of ammonium chloride, the organic solution is separated and evaporated to provide the 6,6 - difluoro-17α-(hepta-1',2'-dien-3'-yl)-17β-ethoxyestr-4-ene-3β-ol product.

One gram of 6,6-difluoro-17α-(hepta-1',2'-dien-3'-yl)-17β-ethoxyestr-4-en-3β-ol in 100 ml. of chloroform which has been distilled over calcium chloride, is stirred for 18 hours at room temperature with 10 g. of freshly precipitated manganese dioxide. The inorganic material is then removed filtration and washed with hot chloroform and the combined filtrate and washings are evaporated to yield 6,6-difluoro - 17α - (hepta-1',2'-dien-3'-yl)-17β-ethoxyestr-4-en-3-one which may be further purified through recrystallization from acetone:hexane.

The 6,6 - difluoro-17α-(hepta-1',2'-dien-3'-yl)-17β-ethoxyestr-4-en-3-one is dissolved in 300 ml. of methanol and 50 ml. of water and treated with 3 cm.³ of concentrated hydrochloric acid at room temperature until TLP indicates the reaction is complete. Water is added and the methanol eliminated under reduced pressure to yield a residue which is filtered, washed with water and air dried to give 6,6-difluoro - 17α - (hepta-1',2'-dien-3'-yl)-estr-4-en-17β-ol-3-one.

The above procedure is repeated with a 10 minute reaction period, with similar results.

Example 4

To a solution of 3 molar equivalents of lithium diethyl copper reagent in 100 ml. of diethyl ether are added 2 g. of 3,17β-dimethoxy - 17α - (3-iodopropynyl)-estra-1,3,-5(10)-triene over a period of 30 minutes with stirring. After the addition, the reaction is allowed to stand at room temperature for a period of 10 hours after which time it is worked up in the usual manner and a 3,17β-dimethoxy-17α-(penta-1',2'-dien-2'-yl)-estra-1,3,5(10)-triene product is recovered via column chromatography and can be hydrolyzed to the 17β-ol compound, as described above.

In like manner, 3-methoxy-17α-(3'-methylhepta-3',4'-dien-5'-yl)-estra-1,3,5(10)- trien - 17β-ol is prepared from 3-methoxy - 17α-(3-iodo-3-methyl-3-ethylpropynyl)-estra-1,3,5-(10)-trien-17β-ol and lithium diethyl copper.

Example 5

17α-(3-chloropropynyl) - 17β - methoxymethyleneoxyestr-5(10)-en-3β-ol (500 mg.) dispersed in 20 ml. of diglyme is added 5 molar equivalents of a solution of lithium dimethyl copper reagent over a period of 20 minutes and with stirring. After the addition, the reaction mixture is allowed to stand at room temperature for a period of 20 hours after which time it is worked up in the usual manner to provide the 17α - (buta-1',2'-dien-3'-yl)-17β-methoxymethyleneoxyestr-5(10)-en-3β-ol product.

A solution of 1 g. of 17α-(buta-1',2'-dien-3'-yl)-17β-ethoxymethyleneoxyestr-5(10)-en-3β-ol in 80 ml. of toluene and 20 ml. of cyclohexanone is dried by removing 10 ml. of solvent by distillation. A solution of 1 g. of aluminum isopropoxide in 7 ml. of anhydrous toluene is then added and the mixture refluxed for 45 minutes. The mixture is neutralized with acetic acid and the solvents removed by steam distillation. The residue is extracted several times with ethyl acetate and these extracts are then washed with 5% hydrochloric acid solution, water, 10% sodium carbonate solution and water to neutrality, dried over anhydrous sodium sulfate and evaporated to dryness to yield 17α-(buta-1',2'-dien-3'-yl)-17β-methoxymethyleneoxyestr-4-en-3-one which may be further purified by chromatography and recrystallization from acetone:hexane.

Example 6

Three hundred milligrams of purified cuprous iodide is suspended in 4 ml. of ether and 1.3 ml. of 2.1 M methyl lithium in ether is added at 0–5° C. A solution of 300 mg. of 3,17β - dimethoxy-17α-(3-bromopropynyl)-estra-1,3,5(10)-triene in ca. 4 ml. of ether is added. After ca. 15 minutes, the reaction mixture is diluted with methylene chloride and water and filtered through celite, dried over anhydrous sodium sulfate and the solvent concentrated under reduced pressure. The residue containing 3,17β-dimethoxy - 17α - (buta-1',2'-dien-3'-yl)-estra - 1,3,5(10)-triene is purified via preparative TLC and GLC.

In like manner, the other 17α-(3-halopropynyl) starting compounds hereof are converted to the 17α-(buta-1',2'-dien-3'-yl) compounds, e.g. 3,17β - dimethoxy-17α-(buta-1',2'-dien-3'-yl)-estra-3,5-diene which can be hydrolyzed to 17α-(buta-1',2'-dien-3'-yl)-estra-4-en-17β-ol-3-one. Similarly, 17α - (buta-1',2'-dien-3'-yl)-18-methyl-estr-4-en-17β-ol-3-one is prepared.

Examples 7 to 18

In accordance with the methods and procedures of the present invention, the following are carried out.

From 17α-(3-iodo-3-n-propylpropynyl) - 17β - (4-methoxytetrahydropyran - 4 - yloxy)-18-methylestr-4-en-3-one and lithium diethyl copper there is obtained the 17α-(octa-4',5'-dien-6'-yl) -17β - (4-methoxytetrahydropyran-4-yloxy)-18-methylestr-4-en-3-one product.

From 17α-(3-bromopropynyl) - 17β - tetrahydrofuran-2'-yloxy - 18 - ethylestr-4-ene and lithium diethyl copper there is obtained the 17α - (penta-1',2'-dien-3'-yl)-17β-tetrahydrofuran-2'-yloxy-18-ethylestr-4-ene product.

From 17α-(3-chloro-3,3-di-n-butylpropynyl)-17β-tetrahydrofuran-2'-yloxyestr-1,3,5(10) - trien-3-ol and lithium di-n-propyl copper there is obtained the 17α-(5'-n-butyl-deca-5',6' - dien-7'-yl) - 17β - tetrahydrofuran-2'-ylestra-1,3,5(10)-trien-3-ol product.

From 17α-(3-bromopropynyl)-17β-methoxy-18-n-propylestr-5(10)-en - 3 - one and lithium diisopropyl copper there is obtained the 17α-(4'-methylpenta-1',2'-dien-3'-yl)-17β-methoxy-18-n-propylestr-5(10)-en-3-one product.

From 17α - (3-bromo-3-methylpropynyl)-3,17β-dimethoxy-18-isopropylestra-1,3,5(10)-triene and lithium di-n-butyl copper there is obtained the corresponding 17α-(octa-2',3'-dien-4'-yl) - 18 - isopropyl - 3,17-dimethoxyestra-1,3,5(10)-triene product.

From 3,17β-diethoxy-17α-(3-chloropropynyl)-oxyestra-1,3,5(10)-triene and lithium di-sec-butyl copper there is obtained the 3,17β-diethoxy-17α-(4'-methylhexa-1',2'-dien-3'-yl)-estra-1,3,5(10)-triene product.

From 17α-(3 - iodo-3-ethylpropynyl)-17β-tetrahydrofuran-2'-yloxy-18-isopropylandrost-4-ene and lithium diisobutyl copper there is obtained the 17α-(7'-methylocta-3',4'-dien-5'-yl)-17β-tetrahydrofuran - 2' - yloxy-18-isopropylandrost-4-ene product.

From 17α-(3 - bromopropynyl)-17β-methoxy-18-methylestr-4-en-3-one dithium di-t-butyl copper there is obtained the 17α-(4',4'-dimethylpenta - 1',2' - dien-3'-yl)-17β-methoxy-18-methylestr-4-en-3-one product.

From 3-methoxy - 17α - (3-chloro-3-methyl-3-ethylpropynyl)-17β - tetrahydropyran-2'-yloxyestra-1,3,5(10)-triene and lithium dimethyl copper there is obtained the 3-methoxy-17α-(3'-methylhexa-3',4'-diene - 5' - yl)-17β-tetrahydropyran-2'-yloxyestra-1,3,5(10)-triene product.

From 3,3-ethylenedioxy - 6,6 - difluoro-17α-(3-bromopropynyl)-17β-methoxymethyleneoxyestr - 4 - ene and lithium diethyl copper there is obtained the corresponding 3,3-ethylenedioxy - 6, - difluoo-17α-(penta-1',2'-dien-3'-yl)-17β-methoxymethyleneoxyestr-4-ene product.

From 3β-acetoxy-6,6-difluoro-17α-(3-chloro-3-methylpropynyl)-17β-ethoxymethyleneoxyandrost-4- and lithium di-n-propyl copper there is obtained the 3β-acetoxy-6,6-difluoro - 17α-(hepta-2',3'-dien-4'-yl)-17β-ethoxymethyleneoxyandrost-4-ene product.

From 6,6 - difluoro-17α-(3-iodopropynyl)-17β-tetrahydrofuran-2'-yloxyandrost-4-ene and lithium diethyl copper there is obtained the 6,6-difluoro-17α-(penta-1',2'-dien-3'-yl)-17β-tetrahydrofuran-2'-yloxyandrost-4-ene.

In accordance with the foregoing methods, the following compounds are prepared:

3β,17β-bis(tetrahydropyran-2'-yloxy)-6,6-difluoro-17α-(buta-1',2'-dien-3'-yl)-estr-4-ene,
3β,17β-bis(tetrahydropyran-2'-yloxy)-6,6-difluoro-(hexa-2',3'-dien-4'-yl)-18-methylestr-4-ene,
6,6-difluoro-17α-(octa-5',6'-dien-7'-yl)-17β-acetoxy-estr-4-ene,
6,6-difluoro-17α-(3'-methylhepta-4',5'-dien-6'-yl)-17β-acetoxyestr-4-en-3-one,
6,6-difluoro-17α-(2',3'-dimethylhepta-3',4'-dien-5'-yl)-17β-propionyloxyandrost-4-en-3-one,
6,6-difluoro-17α-(2'-methylhepta-4',5'-dien-6'-yl)-17β-(4'-methoxytetrahydropyran-4'-yloxy)-4-ene,
6,6-difluoro-(hepta-3',4'-dien-5'-yl)-17β-benzoyloxy-estr-4-en-3-one,
3β-propionyloxy-6,6-difluoro-17α-(buta-1',2'-dien-3'-yl)-androst-4-en-17β-ol,
3β,17β-bis(adamantoyloxy)-6,6-difluoro-17α-(2'-methylhexa-2',3'-dien-4'-yl)-1,2-dien-3-yl-4-ene,
3β-(β-chloropropionyloxy)-6,6-difluoro-17α-(1',2'-dien-3'-yl)-17β-tetrahydrofuran-2'-yloxyandrost-4-ene,
3β-butyryloxy-6,6-difluoro-17α-(4'-methylpenta-1',2'-dien-3'-yl)-17β-tetrahydropyran-2'-yloxyandrost-4-ene,
3β-tetrahydrofuran-2'-yloxy-6,6-difluoro-17α-(3'-methylnona-3',4'-dien-5'-yl)hepta-1',2'-dien-3'-yl)-17β-capropyloxyestr-4-ene,
3β-tetrahydropyran-2'-yloxy-6,6-difluoro-17α-(5'-methylhexa-1',2'-dien-3'-yl)-17β-caproyloxyestr-4-ene,
3β-tetrahydropyran-2'-yloxy-6,6-difluoro-17α-(4'-methylhexa-1',2'-dien-3'-yl)-17β-haptanoyloxyandrost-4-ene, and
3β,17β-dipentanoyloxy-6,6-difluoro-17α-(4',4'-dimethylpenta-1',2'-dien-3'-yl)-estr-4-ene.

Elaboration at C–3β can be performed after the principal reaction as follows:

Example 19

The 3-oxo compounds are reduced by the principal reaction hereof so as to prepared, for example, 17α-(buta-1',2'-dien-3'-yl)estr-4-ene-3β,17β-diol,
17α-(penta-1',2'-dien-3'-yl)-17β-acetoxyestra-5-en-3β-ol,
17α-(4'-methylpenta-1',2'-dien-3'-yl)-17β-tetrahydrofuran-2'-yloxyestr-4-en-3β-ol,
17α-(5'-methylhexa-1',2'-dien-3'-yl)-17β-benzoyloxy-androst-4-en-3β-ol,
17α-(4'-methylhexa-1',2'-dien-3'-yl)-17β-adamantoyloxyestr-4-en-3-ol,
6,6-difluoro-17α-(4',4'-dimethylpenta-1',2'-dien-3'-yl)-estr-4-ene-3β,17β-diol, and
6,6-difluoro-17α-(5'-methylocta-5',6'-dien-7'-yl)estr-5(10)-ene-3β,17β-diol.

EXAMPLE 20

Two milliliters of dihydropyran are added to a solution of 1 g. of 17α-(buta-1',2'-dien-3-yl)-17β-caproyloxyandrost-4-en-3β-ol in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed wtih aqueous sodium carbonate solution and water, dried and evaporated. The residue is chromatographed on neutral alumina, eluting with hexane, to yield 3β-tetrahydropyran-2'-yloxy-17α-(buta-1',2'-dien-3'-yl)-17β - caproyloxyandrost - 4 - ene which is recrystallized from pentane.

To a solution of 1 g. of 17α-(penta-1',2'-dien-3'-yl) androst-4-ene-3β,17β-diol in 20 ml. of benzene is added 20 ml. of dihydrofuran. Five milliliters are distilled off to remove moisture, and the mixture is allowed to cool to room temperature. To the cooled mixture, 0.2 g. of freshly purified p-toluenesulfonyl chloride is added. The mixture is stirred at room temperature for 24 hours and then poured into an excess of 5% aqueous sodium bicarbonate solution. The product is extracted with ethyl acetate, the organic solution is washed with water to neutral, dried over anhydrous magnesium sulfate, and evaporated to dryness under reduced pressure. The oily residue crystallized on the addition of ether to yield the 3β,17β-bis(tetrahydrofuran - 2' - yloxy)-17α-(penta-1',2'-dien-3'-yl)-androst-4-ene.

In like manner, the tetrahydropyranyl and tetrahydrofuranyl ethers of the 17α-propadienyl compounds hereof are prepared, for example, 3β-tetrahydropyran-2'-yloxy-17α-(2'-methylpenta-2',3'-dien-4'-yl)-17β-acetoxy-18-methylandrost-4-ene,
3β-(tetrahydrofuran-2'-yloxy-17α-(octa-3',4'-dien-5'-yl)-17β-heptanoyloxyestr-5(10)-ene,
3β,17β-bis(tetrahydropyran-2'-yloxy)-17α-(4',4'-dimethylpenta-1',2'-dien-3'-yl)-18-ethylandrost-4-ene,
3β-tetrahydropyran-2'-yloxy-17α-(4'-methylhexa-1',2'-dien-3'-yl)-17β-adamantoyloxy-18-methylestr-4-ene,
3β,17β-bis(tetrahydropyran-2'-yloxy)-6,6-difluoro-17α-(buta-1',2'-dien-3'-yl)-18-ethylandrost-4-ene, and
17α-(2',2'-dimethylocta-3',4'-dien-5'-yl)-18-ethylestra-4-en-17-ol.

Example 21

A mixture of 1 g. of 17α-(buta-1',2'-dien-3'-yl)-17β-acetoxyestr-4-en-3β-ol, 4 ml. of pyridine and 2 ml. of acetic anhydride is allowed to stand at room temperature for 15 hours. The mixture is then poured into ice water and the solid which forms is collected by filtration, washed with water and dried to yield 3β,17β-diacetoxy-17α-(buta-1',2'-dien-3'-yl)estr-4-ene which may be further purified through recrystallization from acetone:hexane.

Similarly, the corresponding 3β-esters of the other 17α-propadienyl products thereof are prepared upon substitution of the appropriate starting compound and conventional acylating agent, for example, 3β-trimethylacetoxy-17α-(3'-ethylhexa-3',4'-dien - 5' - yl)-17β-acetoxyestr-4-ene 6,6-difluoro-(hexa-3',4'-dien-5'-yl)-17β-benzoyloxy-estr-4-en-3-one,
6,6-difluoro-17α-(buta-1',2'-dien-3'-yl)-17β-acetoxy-estr-4-en-3-one,
6,6-difluoro-17α-(buta-1',2'-dien-3'-yl)-17β-admantoyl-oxyestr-4-en-3-one, and
6,6-difluoro-17α-(buta-1',2'-dien-3'-yl)-17β-tetrahydropyran-2'-yloxyestr-4-en-3-one.

The corresponding C-3 substituted derivatives of the 17α-alkyl substituted propadienyl products in the estrogen series are prepared in accordance with the above procedures using the 3β-hydroxyl derivative as starting compound. This starting compound can be formed after the principal reaction hereof upon conventional hydrolysis of the protective groupings, such as tetrahydropyran-2'-yloxy grouping, with acid hydrolysis. Representative 3β-substituted compounds of this series thus prepared are:

3-acetoxy-17α-(buta-1',2'-dien-3'yl)-17β-tetrahydrofuran-2'-yloxyestra-1,3,5-(10)-triene,
3,17-diacetoxy-17α-(2'-methylocta-4',5'-dien-6'-yl)-estra-1,3,5(10)-triene,
3,17β-bis(benzoyloxy)-17α-(2',5'-dimethylhexa-2',3'-dien-4'yl)-18-ethylestra-1,3,5(10)-triene, and
3-caproyloxy-17α-(penta-1',2'-dien-3'-yl)17β-tetrahydrofuran-2'-yloxy-18-propylestra-1,3,5(10)-triene.

Further representative 6,6-difluoro-17α-propadienyl-androst-4-enes prepared in accordance with the above procedures are as follows:

3β,17β-diacetoxy-6,6-difluoro-17α-(buta-1',2'-dien-3'-yl)-18-n-propylestr-4-ene,
3β,17β-diacetoxy-6,6-difluoro-17α-(penta-1',2'-dien-3'-yl)-18-n-propylestr-4-ene,
3β,17β-diacetoxy-6,6-difluoro-17α-(hexa-1',2'-dien-3'-yl)-18-methylestr-4-ene, 3β,17β-diacetoxy-6,6-difluoro-17α-(4'-methylpenta-1',
2'-dien-3'-yl)-18-methylestr-4-ene,
3β,17β-dipropionyloxy-6,6-difluoro-17α-(4',4'-dimethyl-
penta-1',2'-dien-3'-yl)estr-4-ene,
3β,17β-dipropionyloxy-6,6-difluoro-17α-(hepta-1',2'-
dien-3'-yl)estr-4-ene,
3β,17β-dipropionyloxy-6,6-difluoro-17α-(penta-2',3'-
dien-4'-yl)-18-methylandrost-4-ene,
3β,17β-bis(tetrahydropyran-2'-yloxy)-6,6-difluoro-18-
isopropyl-17α-(hepta-3',4'-dien-5'-yl)estr-4-ene,
6,6-difluoro-17α-(buta-1',2'-dien-3'-yl)-androst-4-en-
17β-ol-3-one,
6,6-difluoro-17α-(buta-1',2'-dien-3'-yl)-17β-acetoxy-
androst-4-en-3-one,
6,6-difluoro-17α-(buta-1',2'-dien-3'-yl)-18-methyl-
androst-4-en-17β-ol-3-one,
6,6-difluoro-17α-(buta-1',2'-dien-3'-yl)-17β-acetoxy-
oxy-18-methylandrost-4-en-3-one,
6,6-difluoro-17α-(buta-1',2'-dien-3'-yl)estr-4-en-
17β-ol-3-one,
6,6-difluoro-17α-(buta-1',2'-dien-3'yl)-17β-acetoxy-
estr-4-en-3-one,
6,6-difluoro-17α-(buta-1',2'-dien-3'yl)-18-methyl-
estr-4-en-17β-ol-3-one,
6,6-difluoro-17α-(buta-1',2'-dien-3'-yl)-17β-acetoxy-
18-methylestr-4-en-3-one.

What is claimed is:
1. The method which comprises reacting a 17α-(3-substituted propynyl) steroid of the estrogen, estrane, and androstane series, wherein the substituent is bromo, chloro, or iodo, with a lithium dialkyl copper reagent to prepare a corresponding 17α-(α-alkyl substituted propadienyl) steroid of the estrogen, estrane, and androstane series.
2. The method according to claim 1 wherein the substituent is bromo.
3. The method according to claim 2 wherein the lithium dialkyl copper reagent is lithium dimethyl copper.
4. The method according to claim 1 conducted in organic liquid reaction medium.
5. The method according to claim 2 conducted at a temperature of from about —20° C. to about 80° C.
6. The method according to claim 1 wherein the lithium dialkyl copper reagent is lithium dimethyl copper.
7. The method according to claim 1 wherein there is prepared a 17α-(α-alkyl substituted propadienyl steroid of one of the formulas:

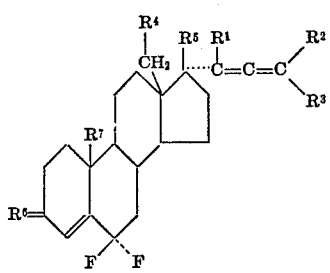

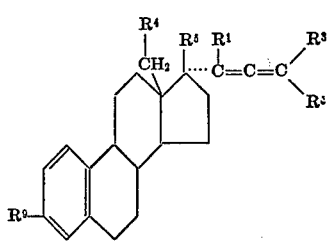

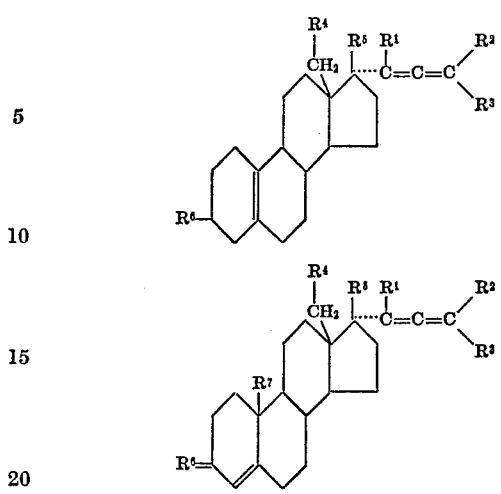

wherein,

R¹ is lower alkyl;
each of R² and R³ is hydrogen or lower alkyl;
R⁴ is hydrogen or alkyl of one to three carbon atoms, inclusive;
R⁵ is hydroxy or a conventional hydrolyzable ester or ether thereof;
R⁶ is an oxo group or the group

in which R⁸ is hydrogen, hydroxy or a conventional hydrolyzable ester or ether thereof;
R⁷ is hydrogen or methyl; and
R⁹ is lower alkoxy of from 1 to 8 carbon atoms, inclusive, cycloalkyloxy, hydroxy or a conventional hydrolyzable ester or ether thereof.
8. The method according to claim 7 wherein a 6,6-difluoro-17α-(α-alkyl substituted propadeneyl)-estr-4-ene or a 6,6-difluoro-17α-(α-alkyl substituted propadienyl)-18-methylestr-4-ene steroid is prepared.
9. The method according to claim 7 wherein a 17α-(α-alkyl substituted propadienyl)-estr-4-ene or a a 17α-(α-alkyl substituted propadienyl)-18-methylestr-4-ene is prepared.
10. A compound selected from those represented by the formula:

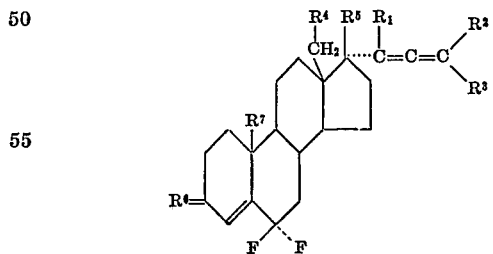

wherein,

R¹ is lower alkyl;
each of R² and R³ is hydrogen or lower alkyl;
R⁴ is hydrogen or alkyl of one to three carbon atoms, inclusive;
R⁵ is hydroxy or a conventional hydrolyzable ester or ether thereof;
R⁶ is an oxo group or the group

in which R⁸ is hydrogen, hydroxy or a conventional hydrolyzable ester or eher thereof; and
R⁷ is methyl.

11. A compound according to claim 10 wherein $R^1$ is methyl and each of $R^2$ and $R^3$ is hydrogen.

12. A compound according to claim 11 wherein $R^6$ is an oxo group.

13. A compound according to claim 12 wherein $R^4$ is hydrogen or methyl.

14. A compound according to claim 13 wherein $R^5$ is hydroxy or carboxylic acyloxy of less than 12 carbon atoms.

15. A compound according to claim 14 wherein $R^4$ is hydrogen and $R^5$ is hydroxy; 6,6-difluoro-17α-(buta-1',2'-dien-3'-yl)androst-4-en-17β-ol-3-one.

16. The compound according to claim 14 wherein $R^4$ is methyl and $R^5$ is hydroxy; 6,6-difluoro-17α-(buta-1',2'-dien-3'-yl)-18-methylandrost-4-en-17β-ol-3-one.

17. The compound according to claim 14 wherein $R^4$ is hydrogen and $R^5$ is acetoxy; 6,6-difluoro-17α-(buta-1', 2'-dien-3'-yl)-17β-acetoxyandrost-4-ene-3-one.

18. The compound according to claim 14 wherein $R^4$ is methyl and $R^5$ is acetoxy; 6,6-difluoro-17α-(buta-1',2'-dien-3'-yl)-17β-acetoxy-18-methylandrost-4-en-3-one.

References Cited
UNITED STATES PATENTS

| | | | |
|---|---|---|---|
| 3,511,861 | 5/1970 | Boswell, Jr. | 260—397.5 |
| 3,541,210 | 11/1970 | Galantay | 424—243 |

ELBERT L. ROBERTS, Primary Examiner

U.S. Cl. X.R.

260—397.1, 397.5, 239.55 C